United States Patent [19]
Peterson

[11] 3,905,016
[45] Sept. 9, 1975

[54] REVERSE SIGNAL ALARM SYSTEM

[76] Inventor: Carl J. Peterson, 4505 Koutenai, Boise, Idaho 83705

[22] Filed: Apr. 11, 1973

[21] Appl. No.: 350,169

[52] U.S. Cl............... 340/70; 340/384 E; 307/9; 331/113 R
[51] Int. Cl.²........................... B60Q 1/26
[58] Field of Search.......... 340/384 E, 70; 307/291, 307/290, 9; 331/113 R

[56] References Cited
UNITED STATES PATENTS

| | | | |
|---|---|---|---|
| 3,483,479 | 12/1969 | Harshbarger................ | 331/113 R |
| 3,588,865 | 6/1971 | Hansen....................... | 340/384 E X |
| 3,631,860 | 1/1972 | Lopin......................... | 331/113 R X |
| 3,728,676 | 4/1973 | Brown........................ | 340/384 E X |
| 3,763,488 | 10/1973 | Klasing...................... | 340/384 E |

Primary Examiner—John W. Caldwell
Assistant Examiner—William M. Wannisky
Attorney, Agent, or Firm—Mason, Mason & Albright

[57] ABSTRACT

An encapsulated self-contained circuit for a reverse alarm to be installed on vehicles and other equipment wherein maximum voltage to power the alarm is limited by a zener diode at 8.5 volts; the circuit is operable to produce adequate decibel strength from the alarm and voltage inputs of less than 75 percent of the maximum voltage as permitted by the zener diode. Two-flip-flop circuits are connected to conductors from negative and positive leads in parallel; the first flip-flop which cycles about once per second is connected to the second flip-flop which produces 900 – 1200 cycles per second from the emitter of a NPN transistor in the first flip-flop to the base of a like transistor the second flip-flop which in turn controls the output of the alarm via a power transistor having an accurately determined current gain rating, in series with the alarm. A diode in series with the negative connection to the direct current energy source prevents harm to the circuit if reverse polarity is accidentally applied.

10 Claims, 1 Drawing Figure

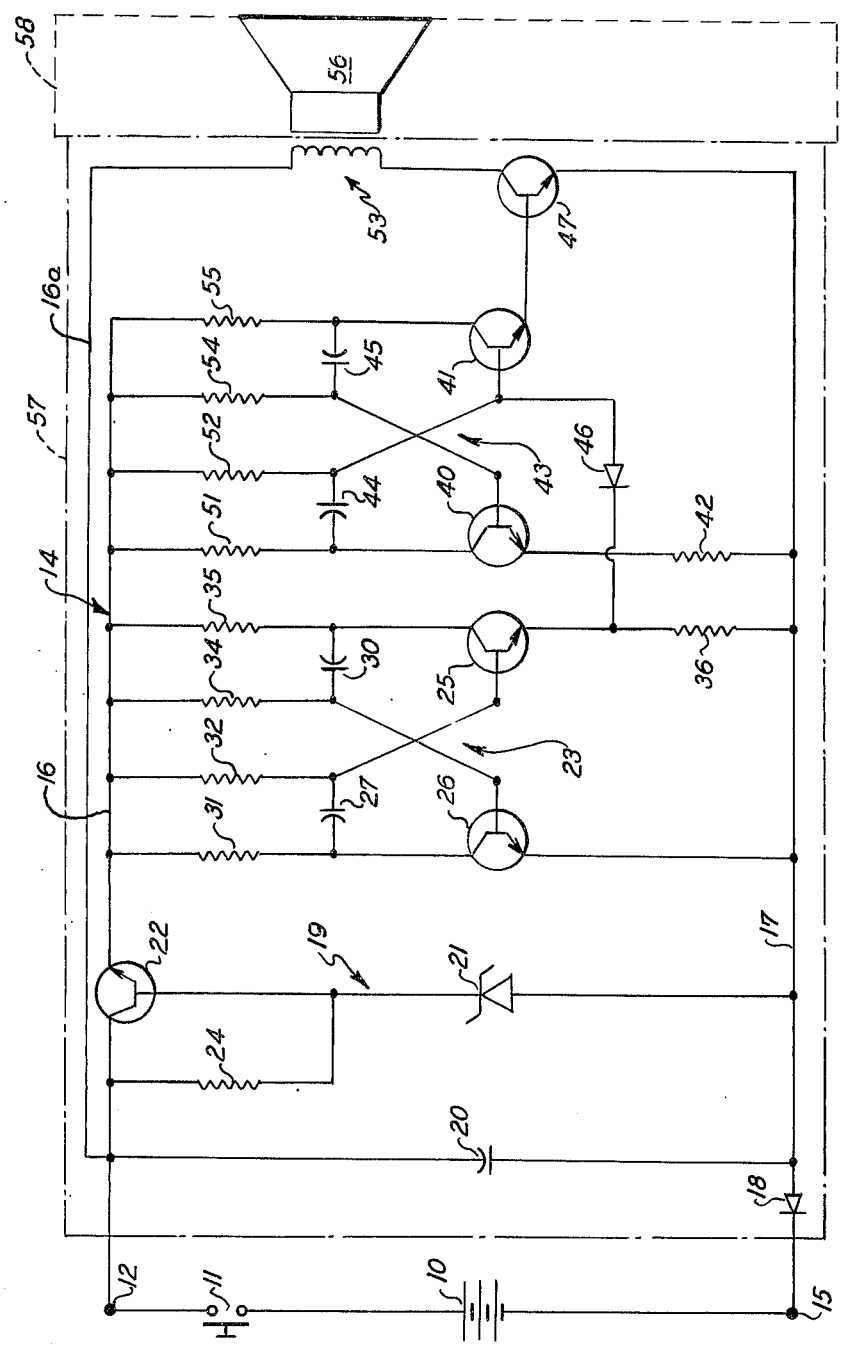

REVERSE SIGNAL ALARM SYSTEM

BACKGROUND OF THE INVENTION

The invention relates to a reverse alarm or warning circuit wherein the alarm is operated intermittently by a timing network included in the circuit.

Reverse alarms are required for vehicles such as trucks, tractors and the like as well as other moving equipment generally used in the construction industry. Such alarms have to meet certain federal and state standards which differ somewhat from agency to agency. However, in general it is required that an intermittent alarm be actuated when the vehicle or other equipment is placed in reverse, and that the sound of the alarm be between 900–1200 cycles per second at about 100 decibels. The problem which arises is that the voltage rating of conventional direct current electrical energy source available, that is the battery and generator or alternator output voltage of the vehicle, may be from six to 36 volts on various types of standard equipment. Moreover, some of the so-called 6 volt systems also may vary considerably in their actual voltage output and it becomes difficult to obtain the necessary power from such "six volt" systems in an alarm circuit which at the same time is compatible with the higher voltage systems up to 36 volts.

SUMMARY OF THE INVENTION

The object of the present invention is a practically damage proof reverse alarm which is adaptable to direct power sources in the range of 6 to 36 volts inclusive, and which at the same time meets the safety standards with all "six volt" systems. This is obtained by encapsulating in plastic the entire alarm circuitry with the exception of two connections; one for the positive and the other for the negative poles of the electrical system involved using solid state components so that there are no moving parts, by minimizing of the number of such solid state components which would otherwise reduce the power available to the speaker member, by the provision of a single connection between the timing and oscillator circuits which drive the speaker, such connection being a direct one from an emitter of a transistor in the timing or pulsing circuit to the base of a transistor in the oscillator circuit with the latter transistor in turn controlling a further power transistor in series with a speaker member for actuating same to obtain the desired intermittent alarm, and by closely controlling the current gain tolerances of the power transistor. Both the timing and the oscillator circuits are flip-flop circuits and are both in parallel across the negative and positive conductors of the system as is also the speaker member and the voltage limiting zener diode. Except for a diode located in the negative conductor near the output for protecting the circuit against accidental damage in the event that reverse polarity is applied, and a transistor connected to the zener diode in series with the positive conductor, all components of the reverse alarm in accordance with the invention are parallel across the positive and negative conductors, such conductors leading to the electrical input connections of the alarm with the components otherwise being completely encapsulated in plastic except, of course, the output of the speaker member. The resulting back-up alarm meets or exceeds safety standards and requirements and at the same time is practically indestructable even with the most rugged usage on various types of construction sites.

Other objects, adaptabilities and capabilities will appear as the description progresses, reference being had to the accompanying drawing wherein a schematic representation of a preferred embodiment of my invention is set forth.

DESCRIPTION OF THE PREFERRED EMBODIMENT

The electrical system of a vehicle or other equipment involved which includes a battery 10, and comprises a direct current electrical energy source having a rated output of 6 volts or more, is in series with a switch 11 which is generally controlled by the gear shift of the vehicle or equipment involved or other means actuated when the vehicle or equipment is moving or prepared to move in a reverse, or another direction wherein it is desirable to have an alarm sounded for safety purposes. Battery 10 is connected via the switch 11 with the positive connection 12 of the alarm circuit designated generally by reference numeral 14 and also to the negative connection 15. Positive connection 12 connects to a first electrical conductor 16 and negative connection 15 connects to a second electrical conductor 17 through a diode 18 (3 amp, 200 PRV) which is provided to prevent damage to the circuit if reverse polarity is accidentally applied. A single diode such as diode 18 is preferred to a bridge circuit which would provide a fixed polarity to the remaining circuit of the device regardless of input polarity to the bridge inasmuch as bridge circuits composed of solid state components generally involve at least two diodes in series. Commercial diodes are temperature sensitive and produce ohmic losses at low temperatures which can be significant until the circuit is warmed up. This, of course, tends to defeat the purpose of producing a reverse alarm which operates satisfactorily with systems of different voltage ratings including "six volt" systems — particularly at low temperatures and before the device is warmed up or if the engine of the device fails.

An electrolytic capacitor 20 is connected across conductors 16 and 17 immediately after the connection 12 on the positive side 16 and diode 18 for the negative conductor 17. Capacitor 20 functions as a filter for voltage variations from the electrical power source or other variations occurring in the electrical circuit of the equipment from whatever source, and is rated at 250 mf.

Next across conductors 16 and 17 is a voltage regulator, designated generally 19, which comprises a zener diode 21 rated at 1 watt and providing an 8.5 maximum voltage differential between conductors 16 and 17. Zener diode 21 is connected to the base of a transistor 22 which is in series with conductor 16 and, further, to conductor 16 on the collector side of transistor 22 through a resistance 24 of 10K ohms. Voltage regulator 19 serves to prevent the circuit thereafter from exceeding 8.5 volts irrespective of what voltage is supplied to the connections 12 and 15 up to 36 volts whereby any standard circuit from 6 to 36 volts may be utilized.

Following voltage regulator 19, in the circuit 14 is a pulsing or first flip-flop circuit, designated generally 23, which, as balanced, is essentially a relatively slow, one cycle per second, two-stage oscillator in which one stage conducts while the other is cut off until a point is reached at which the conditions of the stages are reversed. It will thus be appreciated that the output or base of transistor 25 is coupled to the input or collector of transistor 26 through a feed back capacitor 27 and the output or base of transistor 26 is coupled to the input or collector of transistor 25 through a feed back capacitor 30. An increase in the collector current of the transistor 26 causes a decrease in the collector voltage which, when coupled through the capacitor 27 to the base of the transistor 25, causes a decrease in the collector current of transistor 25. The resulting rising voltage at the collector of transistor 25 when coupled through the capacitor 30 to the base of transistor 26 drives transistor 26 further into conduction. This regenerating process occurs at a frequency determined by the values of resistors 31, 32, 34 and 35 which connect conductor 16 on either side of capacitors 27 and 30. These are 1.5K ohms, 68K ohms, 22K ohms, and 1K ohms, respectively. The capacitances of capacitors 27 and 30 are ten microfarads and twenty microfarads, respectively. A further resistance in flip-flop circuit 23 comprises resistor 36 which is 510 ohms.

Following flip-flop circuit 23 in parallel across the conductors 16 and 17 is a second flip-flop circuit designated generally 43 which comprises transistors 40 and 41 which are connected through capacitors 44 and 45 in the same manner as transistors 25 and 26. In addition, four resistors are provided for connecting the capacitors 44 and 45 on either side to the conductor 16 in a manner similar to that for the first flip-flop circuit 23 through resistances 51, 52, 54 and 55 which are 1K ohms, 10K ohms, 6.8K ohms and 1K ohms respectively. Capacitors 44 and 45 each have a rated capacitance of 0.1 microfarads and the further resistance 42 which connects the emitter of transistor 40 to conductor 17 has a value of 56 ohms. The values of the resistances and capacitance in the second flip-flop circuit 43 provide a frequency of about 1,150 cycles per second.

In order to provide that the second flip-flop circuit 43 oscillates effectively during only one-half the cycle of the first flip-flop circuit 23 an electrical connection is provided between the emitter of transistor 25 and the base of transistor 41 which includes a diode 46 to insure a sharp delineation in the intermittent nature of the alarm. Diode 46 is a silicon rectifier rated at one amp. Finally across conductors 16 and 17 is the speaker circuit designated 53 which comprises a power transistor 47, conductor 16a and a speaker member 56 in series therewith. It will be noted that transistor 47 has its base connected to the emitter of transistor 41 and it also connects in series with speaker member 56 from its collector to conductor 16a. If 105 decibels or more are desired, a sixteen ohm speaker member 56 is utilized. Otherwise an eight ohm speaker may be used. With the exception of transistor 47, all of the transistors in the circuit shown in the drawing are NPN type transistors having a designation of 2N2924. Transistor 47 is also a NPN type transistor which is similar to transistors designated 2N5296. However, the tolerances of industrial type transistors will produce, in this circuit, more variability in the decibel rating of devices manufactured in accordance with the invention than desired. I have solved this by utilizing for power transistor 47 only transistors which otherwise conform to transistors designated 2N5296 having a current gain of 100 or more. This gives the alarm an operating decibel rating in the range of 101 – 111.

As indicated diagrammatically by dot-dash lines designated by reference numeral 57, circuit 14, except for connections 12 and 15, is totally encapsulated in an encapsulating type plastic. The structure of speaker member 56 connects to a bracket shown in dot-dash lines designated 58 which in turn connects to the encapsulating plastic 57. This encapsulated structure permits the unit from being damaged by moisture, dust, dirt or vibration and the circuit is also protected from actual physical damage. There is no sparking or arcing so that the entire unit presents no danger of causing an explosion. Inasmuch as entirely solid state circuitry is utilized, there are no moving parts to wear out which may need adjustment. It is also protected against burn-out due to improper installation as indicated.

Having described my invention, what I desire to secure by Letters Patent of the United States is:

1. An encapsulated solid state circuitry for a reverse signal alarm for a vehicle or the like which comprises: a first flip-flop circuit including a pair of transistors, each having a base, emitter and collector, the base of each of said transistors connected via a feed-back condensor to the collector of the other transistor and including resistances whereby the period of first flip-flop circuit is about one second; a second flip-flop circuit including a further pair of transistors each having a base, emitter and collector, the base of each of said further transistors connected via a feed-back condenser to the collector of the other said further transistors, and including further resistors whereby the period of said flip-flop circuit is about 900 – 1200 cycles per second; said pair and further pair of transistors each having the same industrial rating whereby they are interchangeable in the circuitry diode means only in a circuit connecting the emitter of one of said transistors in said first flip-flop circuit with a base of a further transistor in said second flip-flop circuit whereby said second flip-flop circuit is inoperative for about one-half of the cycle of said first flip-flop circuit, speaker means including a circuit having a control transistor in series therewith, said control transistor amplifying current by a factor of one hundred or better and having its base connected to the emitter of a said further transistor in said second flip-flop circuit whereby said speaker operates at about 900 – 1200 cycles per second for successive constant periods of about one-half second; said circuit of said speaker means, said first flip-flop circuit, and said second flip-flop circuit being connected in parallel for connection to a direct current source, switch means connecting said current source into said circuitry whereby when said switch means is opened voltage is not applied in said circuitry, means in the vehicle on the like sensing that it is in operative condition to proceed in a reverse direction for closing said switch means, and further diode means included in series in said circuitry between the connection of said circuits and said switch means connection of said direct current serving to prevent application of reverse polarity to said circuits whereby the system is inoperable if reverse polarity is applied thereto, the circuitry being entirely encapsulated except leads to said current source.

2. Circuitry for a reverse alarm in accordance with claim 1 wherein said further diode means is in series with the negative connection to said direct current.

3. An encapsulated solid state circuitry in accordance with claim 1 wherein said circuitry is entirely ungrounded except one of said leads, only two of said leads being provided from said encapsulated circuitry.

4. A self-contained circuit without an external connection except for only a pair of electrical connections to a direct current source which provides electrical current in the range of about 6 – 36 volts for a reverse signal alarm for vehicles or the like which comprises: a first electrical conductor leading from one of said connections; a second electrical conductor leading from the other of said connections; and the following components connected in parallel across said first and second conductors: voltage limiting means limiting the voltage across said conductors to not more than about 8½ volts; a first oscillator circuit; a second oscillator circuit; and a horn circuit; wherein the voltage limiting means comprises a first transistor connected in series in said first conductor and a zener diode connecting the base of said first transistor to said second conductor whereby the voltage difference across said first and said second conductors is limited to a predetermined maximum; the second oscillator circuit having a frequency substantially greater than that of the switching action of said first oscillator circuit, said first and second oscillator circuits each comprising a pair of transistors and a pair of feed-back capacitors which are arranged so that the output of one of said transistor pair is coupled to the input of the other of said transistor pair through one of said feed-back capacitors and the output of the other said transistor is coupled through the other feed-back capacitor to the input of said one transistor of said transistor pair, the transistors of said transistor pairs each having the same industrial rating whereby they are interchangeable in said oscillator circuits; said horn circuit including an inductance actuated speaker and a power transistor in series therewith, said power transistor having a current gain of one hundred or more; first diode means being connected in series in one of said conductors after its connection and prior to said components which is adapted to prevent the application of reverse current through said components; second diode means only directly coupling a transistor in said first oscillator circuit to a selected transistor in said second oscillator circuit whereby said second oscillator circuit is interrupted at substantially uniform periods of time each less than about one second in response to each said switching action of said first oscillator circuit, the selected transistor being coupled to the input of said power transistor whereby said inductance is actuated at the frequency of said second oscillator circuit with the interruptions corresponding to the switching actions of said first oscillator circuit.

5. A self-contained circuit in accordance with claim 4 wherein the switching action of said transistor pair of said first oscillating circuit is about 0.5 seconds.

6. A self-contained circuit in accordance with claim 5 wherein the frequency of said second oscillator circuit is in the range of 900 – 1200 cycles per second.

7. A self-contained circuit in accordance with claim 4 wherein all of said components except the output connections and said speaker are encapsulated in non-conductive plastic material.

8. A self-contained circuit in accordance with claim 4 wherein said first conductor is adapted for connection to the positive terminal of a direct current electrical source.

9. A self-contained circuit in accordance with claim 4 wherein said predetermined maximum voltage difference is about 8.5 volts.

10. A self-contained circuit in accordance with claim 9 wherein the decibels produced by said speaker in operation are in a range of 101 – 111.

* * * * *